United States Patent

Euer et al.

[15] 3,665,505

[45] May 23, 1972

[54] APPARATUS AND METHOD FOR MEASURING AND ANALYZING DYNAMIC PROCESSES

[72] Inventors: Hartmut Euer; Guenter Pauli, both of Munich, Germany

[73] Assignee: Vereinigte Flugtechnische Werke Fokker GmbH, Bremen, Germany

[22] Filed: Apr. 22, 1970

[21] Appl. No.: 30,885

[30] Foreign Application Priority Data

Apr. 24, 1969 Germany..................P 19 20 964.4

[52] U.S. Cl. ..........................................................324/77 A
[51] Int. Cl. ....................................G01r 23/16, G01r 27/02
[58] Field of Search ................................................324/77 A

[56] References Cited

UNITED STATES PATENTS

| | | | |
|---|---|---|---|
| 2,970,261 | 1/1961 | Zoll | 324/77 X |
| 3,122,732 | 2/1964 | Lewinstein et al. | 324/77 X |
| 3,243,656 | 3/1966 | Baude | 324/77 X |

*Primary Examiner*—Edward E. Kubasiewicz
*Attorney*—Smyth, Roston & Pavitt

[57] ABSTRACT

Apparatus and method for analyzing dynamic processes represented by a particular time variable information signal within a range for amplitudes of the signal, wherein a signal analyzing amplitude band is defined and particular characteristic portions of the signal when occurring within the band are detected. By means of sweep signal the analyzing band is shifted across the amplitude range and the detected events are accumulated as statistical representation evaluation of the occurrence of the characteristic portions in dependence upon amplitude as represented by the sweep signal as defining the position of the analyzing band within the amplitude range.

16 Claims, 6 Drawing Figures

APPARATUS AND METHOD FOR MEASURING AND ANALYZING DYNAMIC PROCESSES

The present invention relates to a method and apparatus for measuring and analyzing dynamic processes, wherein particularly the behavior of a physical quantity in time is analyzed and processes by counting particular events which occur in analyzing bands to obtain statistical, characteristic functions. The invention relates particularly to the statistical analyzation of signals seemingly having random behavior as a result of superpositioning of different phenomena.

It is known to develop statistical characteristic function of any kind of dynamic process in that the behavior in time, i.e., the temporal characteristics of the respective physical quantity is investigated as to particular events within a particular range or continuum of amplitudes. For this it is customary to subdivide the analyzing range of the physical quantity into several analyzing bands which run in parallel to the time axis. The particular events of interest are counted individually as they occur in the individual analyzing bands. This method, however, has the disadvantage that the accuracy of the resulting characteristic function depends upon the number of analyzing bands thus defined, i.e., the accuracy depends upon the resolution of subdivision of the analyzing range. It is rather uneconomical to provide equipment so as to subdivide the analyzing amplitude range in as many small analyzing bands as required for particular requirements as to resolution. As a consequence, the ascertained characteristic functions include considerable errors.

The teaching of the invention has as its principal task to avoid these disadvantages. The disadvantages are avoided by providing an analyzing band which is variable in width (that is the dimension transverse to the time axis), by causing the analyzing band to progressively sweep the analyzing amplitude range, and by detecting the particular characteristic events as they fall into the band. The detected events are counted and the counting result is considered in relation to the amplitude value defining the current position of the analyzing band within the amplitude range.

This method offers the possibility of ascertaining characteristic functions with comparatively little expenditure. For example, the distribution and frequency of relative or absolute maxima or minima may readily be detected. Also, probability distribution and distribution density can readily be ascertained. The analyzing area may be swept by shifting the analyzing band across the amplitude range continously or in finite steps. In case of a stepwise sweeping of the amplitude range it is of advantage to match the width of the analyzing band with the width of the step for shifting the analyzing band across the analyzing range. Also, the sweeping speed for the analyzing band can be varied within selected limits and direction of sweeping may reversed.

While the specification concludes with claims particularly pointing out and distinctly claiming the subject matter which is regarded as the invention, it is believed that the invention, the objects anf features of the invention and further objects, features and advantages thereof will be better understood from the following description taken in connection with the accompanying drawings in which:

Figure 1:
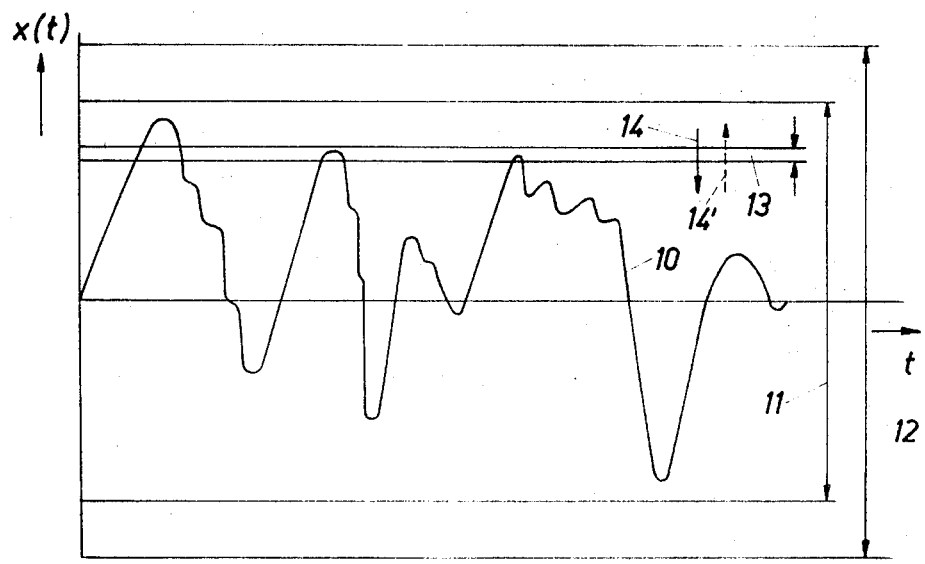
FIG. 1 illustrates schematically a plot of a function representing a physical quantity variable in time.

Proceeding now to a detailed description of the drawings, in FIG. 1 thereof a curve 10 has been plotted representing, for example, the instantaneous magnitude of a physical quantity, for example the amplitude of a particular event as it varies in time and being represented by a function X of time $t$. The curve to be analyzed, may, for example, represent a frequency distribution resulting from investigating the strength of material; or the curve may represent a composite signal, such as an acoustic signal or the like with seemingly random distribution of signal peaks of different amplitude, and the amplitude distribution is to be ascertained and statistically evaluated.

The double arrow 12 denotes the total amplitude range in which amplitude values of the curve 10 are expected to be found; it is basically assumed that function X ($t$), as representing the phenomenon to be investigated, has a range for amplitude values which, for example, for principle reasons, will not exceed that amplitude range. For example, that range 12 may be defined by maximum response limit of measuring transducers. Or in case, the curve represents an attenuated output, the range 12 is defined by the input, and the attenuation is the subject of the investigation.

In the general case an analyzing area or range 11 may be defined within, for example, the theoretical amplitude range 12, which range 11 may be equal to the total amplitude range but may be smaller due to additional, for example, practical restrictions on the representation of the quantity as represented by the curve. The analyzing area 11, as plotted in FIG. 1, therefore, is expected to cover a smaller amplitude range than range 12. The size of the analyzing range 11 may also be defined as the signal range in case the phenomenon to be investigated is represented by a signal which is processed in an attenuating amplifier, or it may be that range in which the particular phenomena of investigatory interest are expected to occur. It is, furthermore, presumed that the amplitude limits defining the range 11 are selectively variable within the total range 12.

Reference numeral 13 now refers to a particular analyzing band running, of course, parallel to the time axis $t$ and being defined in any instance within amplitude range 11. The analyzing band 13 is selected to have a variable width, the width representing or being related to the resolution of the analyzing process. The analyzing band 13 is made to progressively cover the range 11, i.e., range 11 is progressively swept in the direction of arrow 14 or in the opposite direction 14', by progressively shifting 13 across that amplitude range.

As the analyzing band 13 is shifted across analyzing range 11, for example in incremental steps, particular events occurring within the analyzing band are counted; for example, the number of maxima or minima, i.e., particularly directed excursion peaks of the curve 10 are counted, and the count number is associated with the particular position of the analyzing band within the amplitude range. The position of the band may be defined by the amplitude value of its center, and the band spreads for half the band width above and below that center amplitude. The various counting results as resulting from different band position, are processed further to ascertain the desired characteristic function in dependence upon amplitude.

The analyzing speed, i.e., the speed of progression of analyzing band 13 across the analyzing range 11, should be variable to a considerable extent and may match particular requirements in any particular case. That band 13 may progress in steps, i.e. intermittently or on a continuous, uninterrupted basis. In case of stepwise progression of analyzing band 13 the amplitude equivalent of each step should be equal to the width of the band 13, or there should be a definite relation between step height and band width to obtain, for example, definite overlap. In any event, selection of width of the analyzing band and selection of the width of the steps of analyzing band progression should be coupled.

Figure 1A:
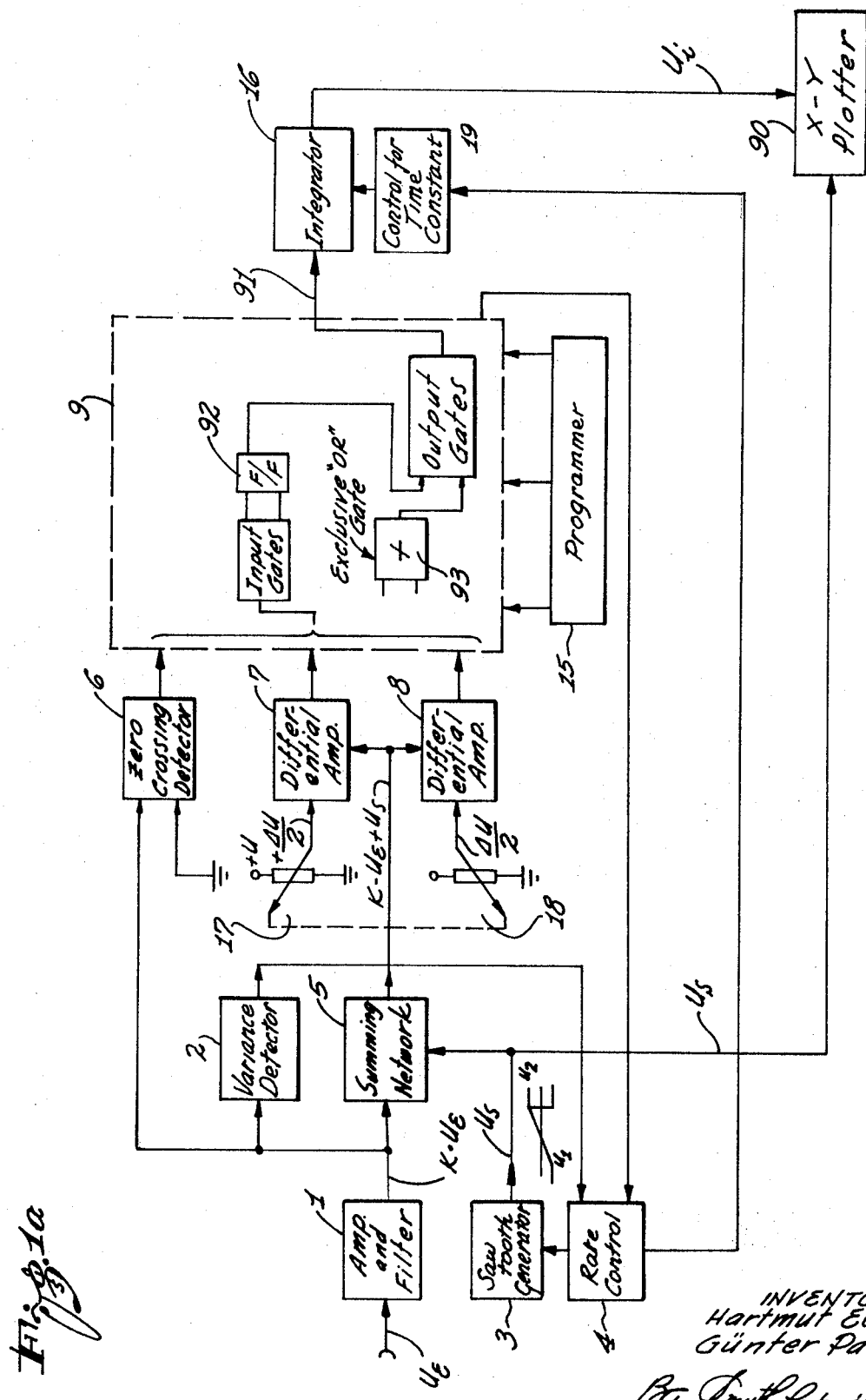
FIG. 1a illustrates a block diagram of an apparatus for practicing the preferred embodiment of the invention.

Turning now to the description of FIG. 1a there is illustrated equipment for carrying out the inventive process. A measuring instrument, transducer or the like, is assumed to develop an electrical signal $U_E$, representing the process to be investigated and analyzed. As an inherent result of the investigatory process or due to threshold behavior of the instrumentation, the signal $U_E$ may have amplitude not exceeding the range 12.

An input circuit 1 is provided to receive signal $U_E$ and to provide appropriate amplification or attenuation as well as impedance matching for the circuitry processing the signal $U_E$ or a replica thereof. The input circuit 1 may include filters and particularly any d.c. components may be removed from the signal to restrict the analyzing process to variable reproduced phenomina and to eliminate, for example, quasi-stationary components.

The output signal of input stage 1 is denoted $K.U_E$, wherein K represents the amplification or gain in circuit 1. In particular, the gain of unit 1 as to a.c. components may be below unity, so that the signal $K.U_E$ varies only within the range 12. The signal $K.U_E$ is fed to a processing stage determining the standard deviation $\sigma$, so that the width $\Delta U$ of the analyzing band 13, as well as the amplitude differential defined by the limits for the analyzing range 11, can be represented in units of $\sigma$.

The relative position of the analyzing band as well as the progressive shifting thereof across the analyzing range is provided by a saw tooth signal generator 3, providing a voltage $U_s$ that varies continuously or in steps. An input section 4 is provided as control stage to establish the slope of the saw tooth wave; more generally, the rate of change of the output of generator 3 is established by this control stage. Accordingly, automatic or manual setting of stage 4 determines the speed of the scanning process according to which an analyzing band is shifted across the range of amplitudes subject to the investigation. That scanning and shifting speed does not have to be uniform but may vary even during an investigatory run. The analyzing band should not be caused to dwell in any section of the amplitude range for which sufficient information has been sampled, nor should the band scan an important range portion at too fast a speed as the counting of events should yield statistically meaningful results.

The input stage 4 determines and establishes also the range 11 to be covered by the scan, for example, in dependence upon the standard deviation $\sigma$. This includes providing of a first signal level $U_1$ and of a second signal level $U_s$ in between which scan signal $U_s$ is caused to vary. It is assumed in particular that $U_s$ varies from $U_1$ as negative equivalent of the maximum amplitude, corresponding to the maximum limit X max as upper limit of range 11, the variation to occur toward more positive values, to $U_s$, corresponding to the positive equivalent of the negative limit X min, which is the lower limit of range 11. In case input device 1 removes d.c. components from the information signals, analyzing range 11 should be provided to extent symmetrical to the zero line. Thus, $U_1 = -U_2$. This, however, is not essential in principal but merely facilitates instrumentation and design.

The output signal $U_s$ is actually the negative equivalent of the center amplitude of the analyzing band. A summing network 5 is provided to algebraically add the information signal $K.U_E$ to the scan voltage $U_s$. The composite output signal of adder 5, $K.U_E + U_s$ is passed to one input each of two comparators 7 and 8, constructed, for example, as differential amplifiers, with very high gain and saturation behavior at a first level when the signal input, as derived from adder 5 exceeds the respective reference signal, and at a second level when that input is below the respective reference.

The second input of comparator 7 receives a reference signal $+\Delta U/2$ as derived from an adjustable voltage source 17, the second input of comparator 8 receives a reference signal $-\Delta U/2$ as derived from an adjustable voltage source 18. An instantaenous signal $K.U_E$ has value within the band in case $-\Delta U/2 < K.U_E + U_s < +\Delta U/2$. Thus, the analyzing band is established by the range defined by $-U_s - \Delta U/2$ and $-U_s + \Delta U/2$, and voltage $\Delta U$ defines the width of the analyzing band. The two adjustable reference sources 17 and 18 are shown with interconnected adjustment. That adjustment may be controlled in response to the output by variance detector 2.

It follows from the foregoing, that the outputs of comparators 7 and 8 are dissimilar when the composite signal $K.U_E + U_s$ is larger than $-\Delta U/2$ but smaller than $+\Delta U/2$. Similarity of outputs of comparators 7 and 8 establishes that the information signal $K.U_E$ is outside of the analyzing band. An exclusive OR gate in a logic circuit 9 may, for example, respond to these conditions. However, different logic combinations may lead to detection of different kinds of characteristics, as will be developed more fully below.

As illustrated, the logic circuit 9 receives additional information. For example, a zero-crossing detector 6 responds to each polarity reversal of the information signal. It may be presumed that detector 6 is a comparator comparing signal $K.U_E + U_s$ with ground potential or zero as reference. Detector 6 provides a first signal level output when the information signal has positive polarity, and a second signal level when the information signal has negative polarity. The logic circuit 9 may include various components all of which are not operating at all times. A programmer 15 is provided to establish enabling signals to several logic gates etc. in circuit 9 to combine the inputs for the circuit so as to render the circuit responsive to the desired phenomena. Different analyzing programs will be explained below.

Logic circuit 9 has an output channel 91 in which appear pulses or signals that are representative of detected specific events to which the circuit has been rendered responsive by programmer 15. A counter 16 is connected to receive the pulses and counts same. The counter 16 may operate digitally or as pulse integrator, the output of which represents the accumulated frequency of the events observed and detected. If the counter 16 is an integrator with fairly short time constant, the output actually represents counted events per chosen time unit. A control circuit 19 is provided to control the time constant of the counter 16, for example, in dependence upon the saw tooth signal to match the integrating-per-unit time process to the rate of change of the generator 3.

As stated above, generator 3 may change output $U_s$ in steps and holding the respective output for a period during which counter 16 counts events. With each step of generator 13 the counter or integrator is reset to begin counting anew.

The output signal Ui of event counter 16 may appear in digital or analog format and is of statistical significance. Signal Ui is correlated with the signal $U_s$ defining the amplitude center value of the band. The signals Ui and $U_s$ may be used as inputs for an X-Y plotter 90 to graphically record the characteristic statistical function in dependence upon amplitude.

The method in accordance with the invention offers the opportunity to investigate the temporal behavior and amplitude distribution of input signal $U_E$ as a function of time in accordance with six possible distribution functions. The logic circuit 9 may include circuitry to permit all of these different analyzations to be conducted, and programmer 15 provides particular operationel selection so that the pulses in line 91 represent the desired phenomena.

Figure 2:
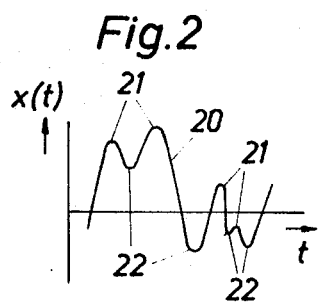
FIGS. 2 through 5 illustrate plots identifying particular events to be detected for statistical evaluation.

FIG. 2 illustrates a curve 20, representing a physical quantity X as a function of time. As time progresses, curve 20 has numerous relative maxima 21 and minima 22. The curve 20, when represented by signal $U_E$, will be processed in the circuit of FIG. 1 as follows: At the beginning of an amplitude range scan signal $U_s$ has a particular negative maximum value $U_s$, so that the analyzing band is near the uppermost limit of the amplitude range to be investigated. As the processed information signal $K.U_E$ has definitely amplitude peaks below the positive equivalent of that limit value, the output of summing network 5 is negative. Accordingly, the two comparators 7 and 8 provide similar outputs.

As indicated, a control connection leads from logic circuit 9 to the controller 4 for generator 3 providing thereto, for example, a control signal that causes the generator 3 to change its output at a relatively high rate. Thus, the analyzing band is shifted down relatively fast until one or several signal peaks are encountered, which is evidenced by a change in state of comparator 8. The resulting change in input for controller 4 causes generator 3 to reduce the slope of the saw tooth signal $U_s$ (or to reduce the stepping rate of stepwise change in output), as now the regular operation begins.

As the signal $U_s$ increases further the analyzing band is shifted down, and relative maxima will be detected by a brief change in output of comparator 8 from false to true not followed by a similarly directed change in output of comparator 7. Therefore, the logic circuit 9 includes circuitry enabled by programmer 15 for detection of relative maxima which respond to a temporary change in output of comparator 8 not accompanied by a change in output of comparator 7. For example, comparator 8 always changes state from false to true when the input signal $K.U_E$ becomes larger than $-U_s - \Delta U/2$ and this signal edge can be used to set a flip-flop 92. Comparator 7 resets the flip-flop when changing state upon input signal $K.U_E$ exceeding the upper band limit $-U_s + \Delta U/2$. However, a peak when occurring in the band, will not cause comparator 7 to change state, and flip-flop 92 will remain set. If the set state of the flip-flop persists for a predetermined period of time, a maximum is recognized and a pulse is set into line 91. Operation of flip-flop 92 is restricted to change of state signals by the comparators in the one particular direction. For each detected maximum a pulse is thus added to the count state of counter or integrator 16.

Additionally or in the alternative relative minima 22 may be detected, counted and the counting result processed. Minima may be recognized by response to a change of state of comparator 7 from true to false not accompanied by a similarly directed change of state of comparator 8. The logic 9 may include circuitry responding to these situations for setting flip-flop 92, or a different one, to provide pulses that are integrated separately, or the minima detecting circuitry is enabled by a different setting of programmer 15 in which case flip-flop 92 responds to minima only. Detection of maxima and minima are actually interchangeable processes, unless both types of extremities are to be detected concurrently. Thus, rather than changing the logic, the same circuit that is used for detecting maxima, can be used for detection of minima, in that programmer 15 causes a polarity reversal of the signal $U_E$ as processed in input circuit 1, whereby the detected maxima of the inverted curve are, of course, equivalent to the detection of minima of the uninverted curve. Still alternatively, the polarity of the output $U_s$ of generator 3 can be reversed or the polarity of the adding process of network 5 is reversed. In either case, the relative direction of amplitude range scanning is reversed.

The relative maxima or the relative minima or both are regarded as the respective particular events to be counted, for example, on a per unit time basis. The counting results in a particular signal Ui representing, as statistical characteristic function, the relative frequency of occurrence of maxima and/or minima in curve 10 and within the respective current band centered around $U_s$. As variable signal $U_s$ scans the amplitude range relatively slowly, gradually or in slow steps, the relative frequency of occurrence of the maxima is represented by variations in the signal Ui, and this signal Ui is plotted against current value of $-U_s$ to obtain relative maximum/minimum frequency of occurrence versus amplitude characteristic.

Figure 3:
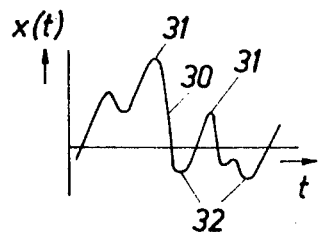

By means of employing the inventive measuring and detection method it is also possible to investigate a physical quantity as to frequency of occurrence of absolute maxima and/or minima in between two zero crossings. FIG. 3 illustrates a function X (t) and the resulting particular curve 30 is to be investigated so as to detect occurrence of absolute maxima or minima in between two zero crossing and within the analyzing band. Such maxima are present, for example, at 31. Analogously, there are absolute minima 32. In these cases an absolute maximum or an absolute minimum within the band represents an event ascertainment of which is to be utilized for developing a statistical characteristic function.

The programmer 15, when set for detection of absolute maxima within the current analyzing band, enables similar circuitry as used for detection of relative maxima. For example, the flip-flop 92 in logic 9 is set when comparator 8 changes state and remains set when comparator 7 does not change state until the next zero crossing is detected by comparator 6. In other words, the detector 6 may provide a strobing pulse that is set into line 91 when flip-flop 92 is set at that time. Absolute minima are detected and counted analogously.

Figure 4:
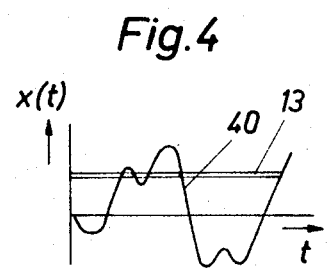

In the foregoing, ascertainment of four different characteristic functions has been described on the basis of detecting maxima and/or minima as characteristic events. Aside from these methods the inventive method offers additional possibilities; e.g., the ascertainment of probability distribution and of probability distribution density, of quantities represented as function of time and detection. FIG. 4 shows the amplitude of a physical quantity as a function of time represented by a curve 40, and it is assumed that the probability distribution density is to be ascertained. For ascertaining probability distribution density one has to ascertain the time, i.e., the period of time in which the curve 40 is within the analyzing band. Ascertainment of that compound period per band position and proper processing of the result leads to a function which represents probability distribution density. For this the programmer 15 may enable an "exclusive or" gate 93 in logic 9, providing a true output when the instantaneous value of curve 40 is within the band as represented by different states of comparators 7 and 8. The curve is outside of the band when the comparators have similar states. The duration of response of the "exclusive or" gate is counted. For this, analog type integration may be preferred although digitization is possible.

Figure 5:
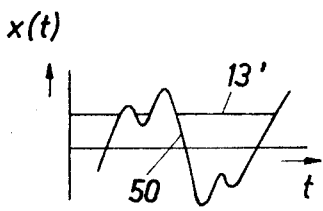

The probability distribution itself can be ascertained through determination of the relative periods for which a curve remains below a threshold level. This is shown representatively in FIG. 5. The threshold level 13' is, of course, variable, and relative periods are ascertained during which, for example, comparator 8 is in the state corresponding to a signal amplitude $K.U_E$ below the threshold as represented by signal $-U_s-\Delta U/2$. This particular acquisition process can also be generated by considering the operation as an asymmetric band width analysis, setting the reference input for comparator 8 to zero, and disregarding the output of comparator 7, so that the band is actually defined by current signal level $U_s$ and lower range limit.

It was presumed in the foregoing, that amplitude signal $U_s$ is steadily variable, or is varied in steps of particular duration to progressively shift location of the analyzing band in the amplitude continuum. However, the inventive method permits stopping of the analyzing band in any particular amplitude level, so as to extend the period of acquisition of the particular event sought to be detected. If counter or integrator 16 is operated to provide output or a per unit time basis, then the duration of an analyzing step at a particular amplitude level $U_s$ is immaterial except that it should be long enough to meet the requirement of statistical observation, and that may require extension of the observation period.

The invention is not limited to the embodiments described above but all changes and modifications thereof not constituting departures from the spirit and scope of the invention are intended to be included.

We claim:
1. Apparatus for analyzing dynamic processes represented by a particular time variable information signal within a range for amplitudes of the signal comprising:
   first means for providing representation of the information signal to vary within a particular amplitude range;
   second means connected to the first means to superimpose thereto a time variable signal;
   third means including threshold means connected to be responsive to particular characteristic portions of the signal to define occurrence of the characteristic portion of the signal within an analyzing band, and providing logic signals representative of such occurrence;
   fourth means connected to the second and third means to provide variable representation corresponding to shifting the analyzing band within the amplitude range for the signal; and
   fifth means connected to the third means to accumulate the logic signals as statistical representation evaluation of the occurrence of the characteristic portions in dependence upon amplitude as represented by the amplitude variable representation of position of the analyzing band within the amplitude range.

2. Apparatus as in claim 1, the second means providing a steadily, time variable signal in representation of amplitude range scanning, there being means to superimpose the time variable information signal and the range scan signal to obtain range scanning.

3. Apparatus as in claim 1, the second means providing a step function signal in representation of stepwise amplitude range scanning, there being means to superimpose the time variable information signal and the range scan signal to obtain range scanning.

4. Apparatus as in claim 2, the width of the band as provided by the third means, being particularly related to the value of amplitude increment for each step.

5. Apparatus as in claim 1, the second means providing an amplitude scan signal variable between first and second limits defining the amplitude analyzing range, the value of the scan signal defining the position of the analyzing band within the amplitude range.

6. Apparatus as in claim 5, at least one of the first and second limits being adjustable.

7. Apparatus as in claim 5, including means to reverse the relationship between scan direction and polarity of the information signal.

8. Apparatus as in claim 1, including means for adjusting the rate of shifting as provided by the fourth means.

9. Apparatus as in claim 1, including means for maintaining the analyzing band at a particular amplitude within the range.

10. Apparatus as in claim 1, and including means operating the second means for providing relative fast shifting of the analyzing band until the third means has detected at least one said characteristic portions, and operating the fourth means subsequently for a slower rate of shifting.

11. Apparatus as in claim 1, the third means responsive to relative maxima of the information signal as the characteristic portion.

12. Apparatus as in claim 1, and including means connected to be responsive to zero crossings of the information signal, the third means responsive to maxima of the information signal and to the detected zero crossings for detection of absolute maxima in between zero crossings as the characteristic portion.

13. Apparatus as in claim 1, the third means responsive to relative minima of the information signal as the characteristic portion.

14. Apparatus as in claim 1, and including means connected to be responsive to zero crossings of the information signal, the third means responsive to minima of the information signal and to the detected zero crossings for detection of absolute minima in between zero crossings as the characteristic portion.

15. Apparatus as in claim 1, the third means responsive to persistance of information of information amplitudes in the analyzing band.

16. Apparatus as in claim 1, the third means responsive to signal amplitudes different from signal levels of at least one limit as defined by the band.

* * * * *